United States Patent
Llorente Gonzalez et al.

(10) Patent No.: US 8,511,996 B2
(45) Date of Patent: Aug. 20, 2013

(54) BLADE FOR WIND-POWER GENERATOR FORMED BY ATTACHING MULTIPLE INDEPENDENT SECTIONS UTILIZING CONNECTION MEANS AT THE END OF EACH OPPOSING SECTIONS

(75) Inventors: Jose Ignacio Llorente Gonzalez, Pamplona (ES); Sergio Velez Oria, Pamplona (ES)

(73) Assignee: Gamesa Innovation & Technology, S.L., Zamudio (Vizcaya) (ES)

( * ) Notice: Subject to any disclaimer, the term of this patent is extended or adjusted under 35 U.S.C. 154(b) by 776 days.

(21) Appl. No.: 11/886,613

(22) PCT Filed: Mar. 20, 2006

(86) PCT No.: PCT/ES2006/000147
§ 371 (c)(1),
(2), (4) Date: Jan. 13, 2009

(87) PCT Pub. No.: WO2006/103307
PCT Pub. Date: Oct. 5, 2006

(65) Prior Publication Data
US 2009/0208341 A1    Aug. 20, 2009

(30) Foreign Application Priority Data
Mar. 31, 2005 (ES) .................................. 200500740

(51) Int. Cl.
*F03D 1/06* (2006.01)
(52) U.S. Cl.
USPC ......... 416/132 B; 416/226; 416/230; 416/233

(58) Field of Classification Search
USPC ................... 416/223 R, 226, 132 B, 230, 233
See application file for complete search history.

(56) References Cited

U.S. PATENT DOCUMENTS

| | | | |
|---|---|---|---|
| 4,260,332 A * | 4/1981 | Weingart et al. | 416/226 |
| 4,389,162 A * | 6/1983 | Doellinger et al. | 416/225 |
| 4,976,587 A * | 12/1990 | Johnston et al. | 416/230 |
| 5,372,336 A * | 12/1994 | Paez | 244/49 |
| 6,260,798 B1 * | 7/2001 | Casiez et al. | 244/49 |
| 2003/0138290 A1 * | 7/2003 | Wobben | 403/293 |

FOREIGN PATENT DOCUMENTS

| | | |
|---|---|---|
| EP | 1 584 817 | 10/2005 |
| JP | 2004-11616 | 1/2004 |
| WO | 2006/002621 | 1/2006 |

OTHER PUBLICATIONS

English abstract of JP 2004-11616 dated Jan. 15, 2004.
English abstract of EP 1 584 817 dated Oct. 12, 2005.

* cited by examiner

*Primary Examiner* — Anh Mai
(74) *Attorney, Agent, or Firm* — Ladas & Parry LLP (57) ABSTRACT

The invention relates to a blade for wind-power generators. The inventive blade is divided transversely into two or more independent sections, each section comprising aerodynamic skins or walls (3) and an inner longitudinal reinforcing structure (4). In addition, the ends of the aforementioned sections are equipped with connection means comprising metal inserts (10) which are housed and fixed axially inside the walls of the inner longitudinal resistant structure.

7 Claims, 6 Drawing Sheets

BLADE FOR WIND-POWER GENERATOR FORMED BY ATTACHING MULTIPLE INDEPENDENT SECTIONS UTILIZING CONNECTION MEANS AT THE END OF EACH OPPOSING SECTIONS

This invention refers to a blade for wind-power generators, which is transversally sub-divided into two or more independent sections, each of which comprises a resistant longitudinal structure and an aerodynamic external wall or hull, with the counter-facing end sections equipped with connection means.

Wind-power generators are designed to obtain higher levels of power every day. Among the components which impact on the power of wind turbines are the blades which comprise the rotor. The aerodynamics and dimensions of blades are fundamental aspects for increasing the power of a wind turbine. It is for this reason that longer blades are manufactured every day.

Due to wind-power generators usually being erected in places that are difficult to access, the transport of blades usually represents a significant problem, particularly due to their length. In order to resolve this problem the technique of transversally sub-dividing blades into two or more independent sections which have connection means on the counter-facing sections is already known.

In this sense EP 1244873 can be quoted, which describes a blade for a wind turbine rotor which is transversally subdivided into sections that are joined together with a multitude of plates connecting the counter-facing edges of consecutive sections. The connection system causes pre-tensioning making the composite operate by compression, which obliges the load per connection to be limited, thus making an increased number of connections points necessary, spread along the entire aerodynamic profile. In addition, the connection elements protrude from the aerodynamic surface, thus causing a loss of yield for the wind turbine.

EP 1184566 describes a blade for wind turbines comprised by two or more longitudinal sections which can be successively connected together, each of which comprises a beam formed by a carbon fibre pipe having a series of transversal carbon fibre or fibre glass ribs upon it. A covering formed by carbon fibre or fibre glass hull is placed upon said unit. The sections of the pipe which form the beam have bushings connected internally and externally on its ends which serve as a mechanism for connecting consecutive sections. The beam of the blade sections is formed by a carbon fibre tube with a small diameter section in comparison with that of the blade sections. This therefore requires the placement of the transversal ribs, also made of carbon fibre, in order to provide a consistently strong structure. The aforementioned requirement for the rib placement supposes a complication and an increased blade manufacturing cost, particularly in relation to the assembly and adhesive processes. In addition, due to the aforementioned situation of the small reinforcement beam section in relation to the section of the blade and as the connection between blade sections is performed by means of bushings connected to the beam, this requires an elevated number of anchoring points between the bushings and the reinforcement beams of consecutive sections, around the entire bushing boundary, this in turn can mean that certain connection points that may be connected with screws can be difficult to access, thus creating an problem on assembly, which must be carried out at the wind turbine installation site. In addition, due to the position of the connection bolts not being aligned with the resistant material, secondary loads are produced on both the bushing and the resistant beam.

Patent application EP 4380080, of the same applicants as this present application, describes a wind-power generator blade which is transversally sub-divided into two or more independent sections which include external aerodynamic walls or hulls and a longitudinal inner reinforcing structure. Said sections are equipped with connection means on their end sections, with said devices including lugs joined to the longitudinal inner reinforcing structure and said lugs having orifices to receive connection screws and bolts. The lugs protrude from the end sections of the longitudinal inner resistant structure in an axial direction, approximately parallel to the shaft of the same and are located in matching positions on consecutive sections in order to receive the connection means through the orifices of each pair of counter-facing lugs. The lugs are adjoined and connected to the walls of the longitudinal inner resistant structure by means of screws, bolts or similar fixtures. This requires an elevated number of holes to be drilled, both on the walls of the longitudinal inner reinforcing structure and on the parts which comprise the blades in order for the connection screws and bolts to be located. This may suppose an increase in cost of the manufacturing processes and a reduction in the wall sections of the longitudinal inner reinforcing structure, with the consequent weakening of the same.

The field of this invention is that of eliminating the aforementioned problems, by means of a blade sub-divided into two or more independent sections, which include an longitudinal inner reinforcing structure equipped, on its end sections, with connection means which include a relatively small number of connection points and, in addition, that said connection points are easily accessible, thus facilitating assembly operations at the wind turbine installation site. In addition, the connection elements do not protrude in relation to the aerodynamic surface.

Another field of the invention is that of combining the connection means of the sections with a special configuration of the longitudinal reinforcing structure, in a manner which obtains the a highly secure connection between sections, without causing practically any reduction to the section of the walls of the longitudinal inner reinforcing structure. In addition, the connection means are anchored to the end sections of the longitudinal inner reinforcing structure by processes which suppose practically no increase in the cost of manufacturing the blade.

The invention enables connection bolts to be located in line with the resistant material, thus eliminating the risk of causing secondary loads.

The blade of this invention is the exposed type, transversally sub-divided into two or more independent sections which include external aerodynamic walls or hulls and a longitudinal inner reinforcing structure, with said structure including walls that are adjoined and connected by means of adhesive to the aerodynamic hulls of the sections, also having connection means located at its end sections including counter-facing orifices for receiving fixture screws and bolts.

This invention is particularly focused on achieving connection means which have a relatively reduced number of connection points and that said points are easy to access, thus facilitating assembly tasks at the wind turbine installation site. A special configuration of the walls of the longitudinal inner reinforcing structure is also contemplated, thus enabling a system for joining the connection means to said walls by means of processes which suppose practically no increase to the cost of the blade.

Therefore, the connection means consist of metal inserts which are housed and secured axially inside the walls of the longitudinal inner reinforcing structure, along the free edge of the same and located in matching positions.

The metal inserts are preferably arranged on the walls of the longitudinal inner resistant structure that are adjoined to the aerodynamic walls or hulls, they may also be located on the intermediate walls of said structure.

The walls of the longitudinal reinforcing structure can be formed by a sandwich comprised of reinforcing fibre layers, preferably carbon fibre, and an intermediate core.

According to one embodiment, the metal inserts can, for example, be located in housings machined into the walls of the longitudinal inner reinforcing structure, along the free edge of the same, and fixed with adhesive to the reinforcing fibre layers. In this embodiment, the sandwich which forms the walls is converted into the end sections, on which the metal inserts are located on a solid sheet of reinforced fibre, of carbon fibre or fibre glass for example, upon which the housings for the inserts are machined.

According to a variant embodiment, tubular carbon fibre profiles are located on the walls of the longitudinal inner reinforcing structure, along the free edge of the same, as the core of the sandwich, which make contact with and are joined to the carbon fibre layers of said sandwich. These profiles house the metal inserts, which have an external section the same as the internal section of the profiles, to which they are fixed by means of adhesive.

In all cases the fixture is be means of adhesive, the curing of which may or may not take place at the same time as that of the walls of the longitudinal inner reinforcing structure.

The metal inserts can have, based on the external section, counter-facing axial drill holes for receiving connection bolts secured by means of nuts under traction. In this case the drilled hole of one of the inserts can be threaded in order to secure one of the ends of the bolt, whilst the opposing drill hole is not threaded and is slightly larger in diameter than the bolt, in order to allow a section of said bolt to protrude on the opposite side in order to receive a locking nut.

The metal inserts can also have lugs, on the external section, each with an orifice and positioned so that when two consecutive sections are coupled together the lugs of the counter-facing inserts are adjacent to the counter-facing orifices in order to receive connection bolts which will be located perpendicular to the longitudinal shaft of the sections and secured by means of nuts, with said bolts under sheer stress.

All of the aforementioned characteristics can be better understood from the following description referring to the enclosed drawings showing, but not limited to, an example of an embodiment.

Figure 1:
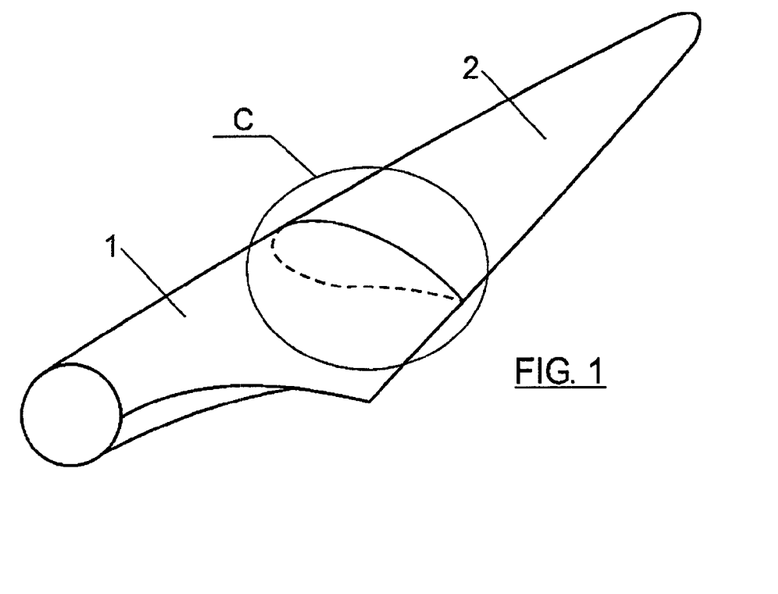
FIG. 1 is a view of a wind turbine blade which appears transversally sub-divided into two independent sections.

FIG. 1 shows a wind-power generator blade, of traditional configuration, which is transversally sub-divided into two sections referenced as numbers 1 and 2. These sections have matching counter-facing sections, representing the perspective and elevation of FIGS. 2 and 3.

Figure 2:
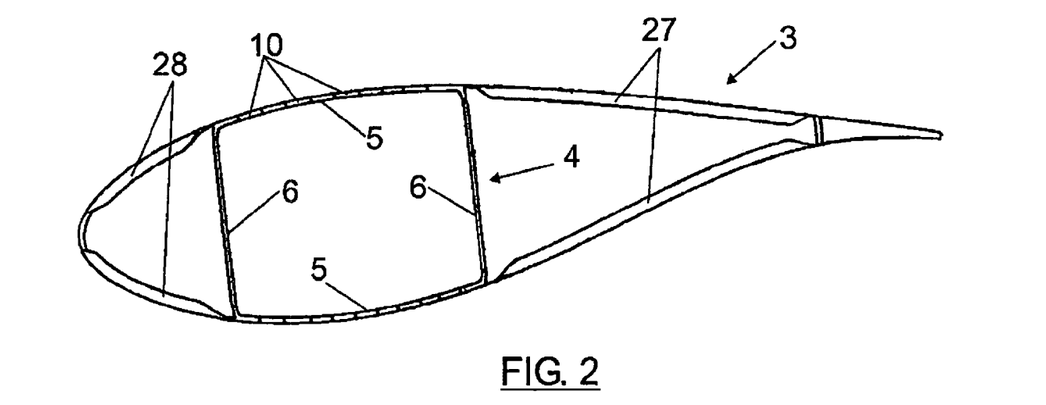
FIG. 2 shows a front elevation of the adjacent outline of the sections which comprise the blade of FIG. 1.
Figure 3:
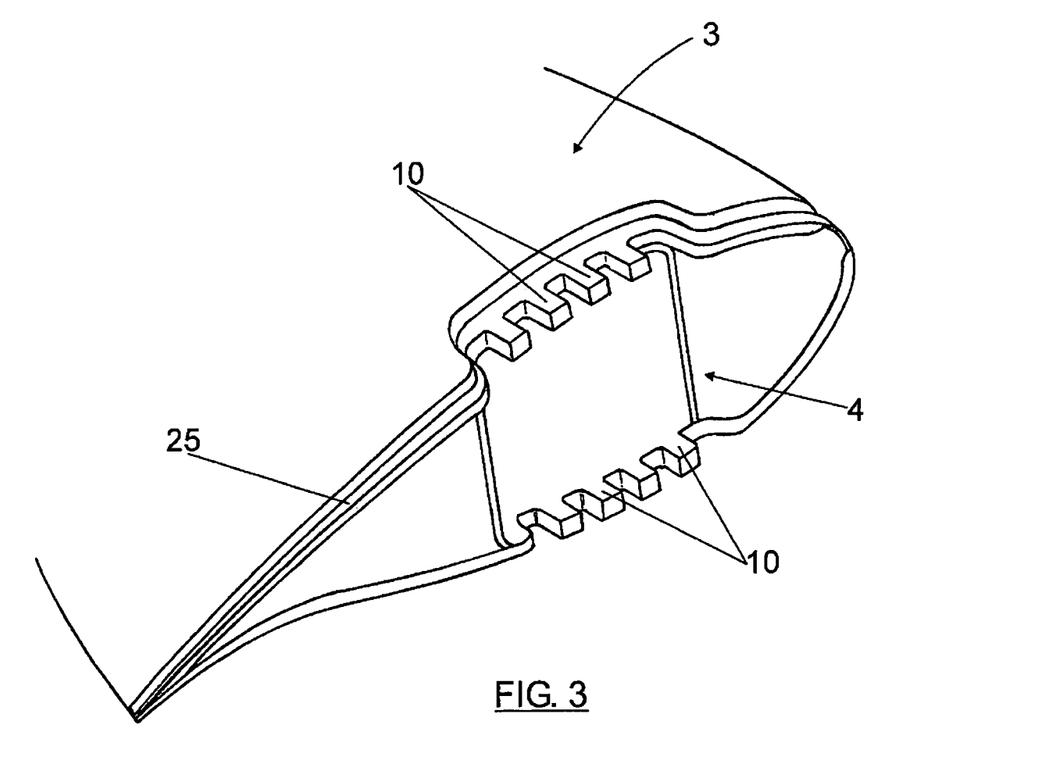
FIG. 3 shows a sectional view of FIG. 2, of one of the sections which comprises the blade of FIG. 1.

Each of sections 1 and 2 include an external aerodynamic wall or hull, which is referenced as number 3, and a longitudinal inner reinforcing structure, indicated as number 4 which in the example shown in the drawings is conceived as a box beam running along the sections, having walls 5 that are adjoined and form part of the hull 3, and intermediate walls 6.

Sections 1 and 2 have connection means on their opposing sections, said devices are located on the adjacent end sections of the longitudinal inner reinforcing structure 4. The aforementioned connection means will preferably be located to coincide with the walls 5 of the longitudinal inner reinforcing structure 4.

On blades of great length, in order to meet certain rigidity and weight requirements, carbon fibre is used for forming the walls of the longitudinal inner reinforcing structure 4, at least on the walls 5. If the specific rigidity of the carbon fibre is very high, the thickness is slightly less than if reduced cost fibre glass were used. Therefore, the bending of the walls made of carbon fibre becomes much more important to the point that it becomes a dimensioning criteria. In order to avoid both this and the consequent increase in the amount of carbon fibre required, a sandwich structure is therefore used in stead of a solid laminate, as with other types of thin structural elements.

Figure 4:
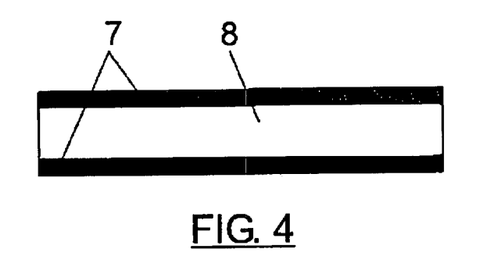
FIG. 4 is a partial layout section of the wall of the longitudinal inner reinforcing structure of the blade sections.

FIG. 4 shows a sketch of a section of wall with a sandwich structure, comprising layers 7 of carbon fibre laminates and an intermediate nucleus 8, of a generally less expensive and lighter product, such as balsa wood, foam, etc.

With this constitution the amount of carbon fibre can be reduced, providing the consequent cost savings and weight reduction, whilst achieving a thickness to enable the bending of the walls to be excluded as a dimensioning criterion.

According to another characteristic of the invention, the connection means consist of metal inserts which are housed and fixed axially within the walls of the longitudinal inner reinforcing structure, along the free edge of the same, in positions matching the counter-facing sections of sections 1 and 2. The metal inserts are specially arranged on the walls 5 of the longitudinal inner structure 4.

Figure 5:
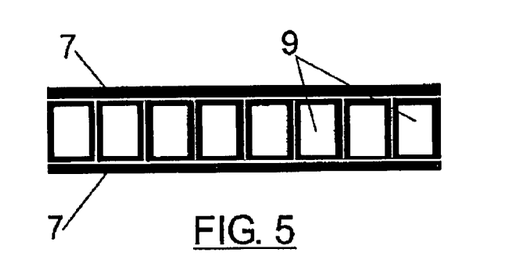
FIG. 5 is a similar view to FIG. 4, showing a variant of the embodiment.
Figure 6:
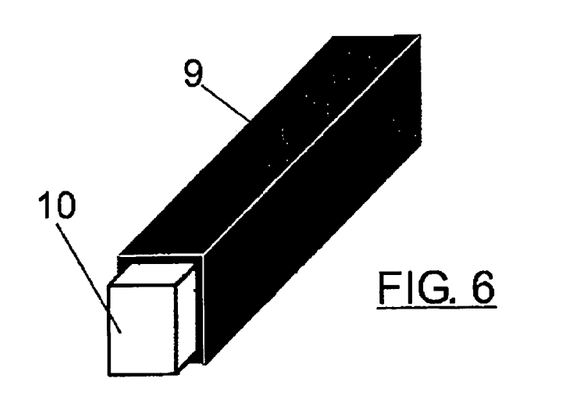
FIG. 6 is a view of the profiles included in the section of FIG. 5, for coupling and fixing the metal inserts which constitute the connection means.

According to the embodiment shown in FIGS. 5 and 6, along the walls of the longitudinal inner structure 4, along the walls 5 at least, carbon fibre rectangular sectioned profiles of carbon fibre 9 are incorporated in line with the core 8 of the wall, FIG. 4, thus replacing the core with these profiles either along the entire width of the wall or on particular points or areas. The height of the profiles 9 will be approximately the same as the thickness of the core 8, so that said profiles make contact with the carbon laminate 7, to which they are joined by means of adhesive or by a cocuring process of the laminate and profiles. The profiles 9 can be manufactured by pultrusion, for example.

The metal inserts 10 are located inside these profiles and are glued with adhesive to the inner surface of the profiles. Logically the metal inserts 10 must have an external section which is equal to the internal section of the profiles 9. The inserts 10 can be adhered to the profiles 9 before the profile is integrated into the longitudinal inner structure, in which case the part to be integrated in the wall of the structure 4 would be configured as show in FIG. 6.

Figure 7:
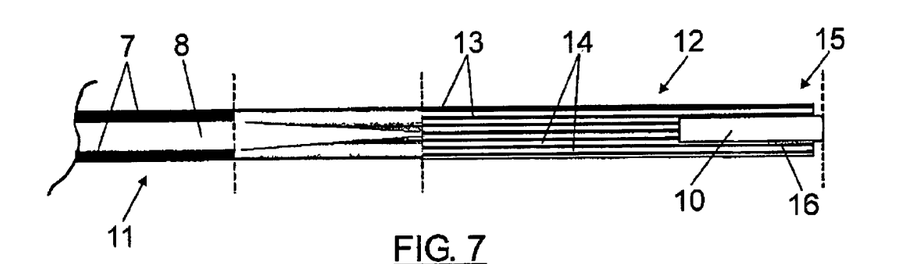
FIG. 7 is a partial layout section of the wall of the longitudinal inner reinforcing structure, showing a variant of the embodiment.

The integration of the metal inserts 10 in the wall of the longitudinal reinforcing structure 4 can be also carried out by machining cavities into wall, along the free edge of the same, sized in order to house said inserts. To do so, the wall of the longitudinal inner reinforcing structure 4 must have, at least around the area where the cavities are machined, one solid laminate which allows the inserts to be fixed with adhesive. Therefore, as shown in FIG. 7, the sandwich structure 11, comprised by the two laminates 7 and 8, must be replaced with one solid laminate 12, which can be of carbon fibre or layers 13 of carbon fibre and layers 14 of lower cost fibre glass. The correctly sized cavities 16 are machined on the free edge 15 to house the inserts 10. In this embodiment a circular insert section may be preferred, as explained later.

Independently of which configuration the inserts have and of the method for integrating them onto the beam, the connection concept is different according to the connection elements located between the inserts of the blade sections to be connected under either shear stress or tension.

The connection elements can, for example, be comprised of bolts that are threaded on the ends. In this case the inserts can be different on both sections in order to allow the assembly and pre-tensioning of the bolts, as shown in FIGS. 8 and 9.

Figure 8:
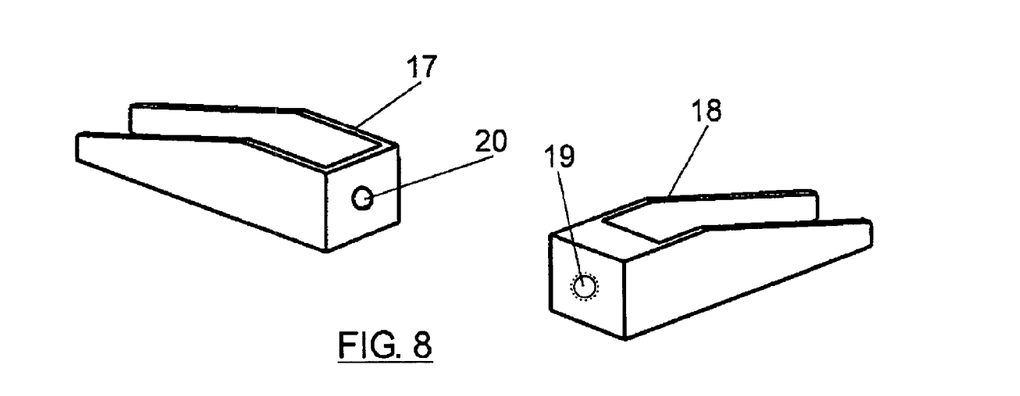
FIG. 8 shows a view of a possible embodiment of the metal inserts.
Figure 9:
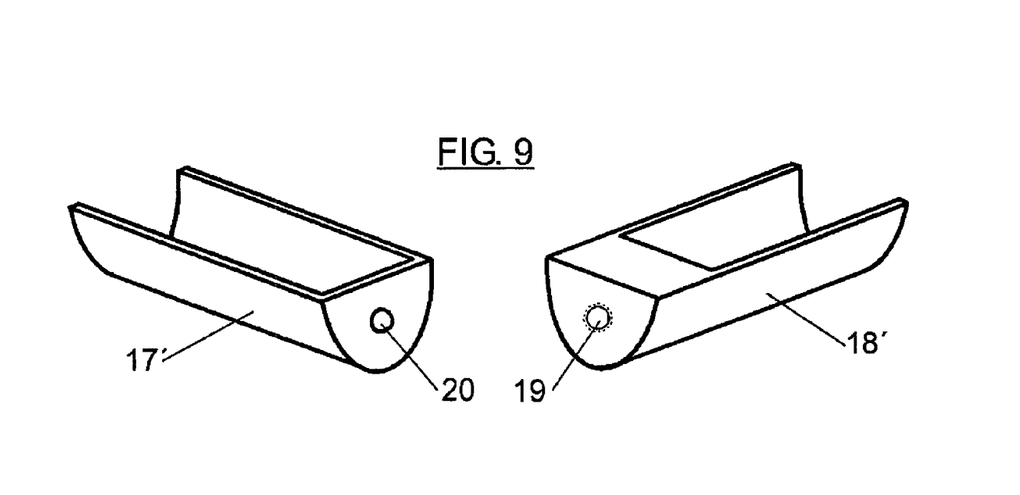
FIG. 9 is a similar view to FIG. 8, showing a variant of the embodiment for the metal inserts.

In FIG. 8 the metal inserts 10 can consist of metal parts 17 and 18 with a U shaped configuration, with the central area, thicker on part 18, having a threaded hole 19 in which one of the ends of the bolts can be screwed. The opposing part 17 can have an intermediate wall of a lesser thickness with an unthreaded drill hole 20 of a diameter slightly larger than that of the bolt in order to allow the said bolt to pass freely through the hole and a portion to protrude through part 17, a locking nut or counter nut is secured to the protruding section.

Depending on the pre-tensioning method to be used for the nuts, tightening torque, drawing torque, etc. different details must be implemented for housing the nut.

As a variant of the aforementioned option, the connection can be performed with two inserts such as the one referenced with number 17 in FIG. 8, in this case two tightening nuts and counternuts or other similar device must be included to prevent the nuts from loosening.

Understandably, the profile of the inserts may change in cases where instead of rectangular profiles being used, the adaptation method is that of the transition to the solid laminate. In this case, the housing is made by means of drilling and therefore the bolt will preferably have a circular shape, as previously mentioned, approximately semi-cylindrical for example as shown in FIG. 9. In this embodiment, parts 17' and 18' refer to part 17 and 18 of FIG. 8, with their corresponding drilled hole, threaded 19 and not threaded 20.

Figure 10:
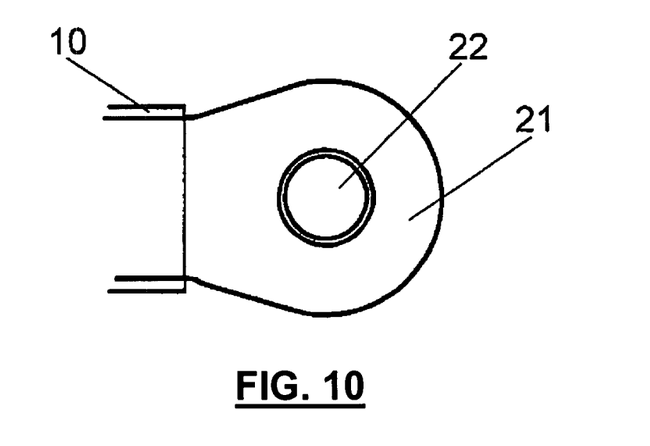
FIG. 10 shows a variant of the embodiment of the outer end of the metal inserts.
Figure 11:
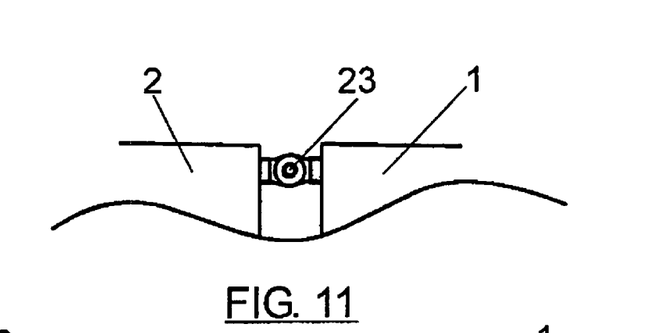
FIGS. 11 and 12 are a side elevation and plan view respectively of the connection of the sections which comprise the blade of FIG. 1, with the inserts of FIG. 10.
Figure 12:
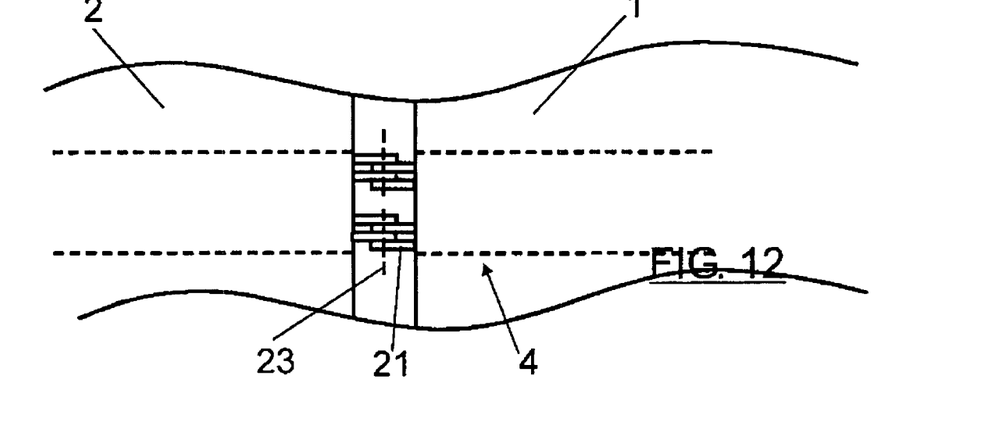

FIG. 10 shows a different version of an embodiment in which the connection elements function under shear stress. In this case the metal inserts 10 are equipped with a lug 21 with an orifice 22. The lugs 21 of the counter-facing inserts 10 of sections 1 and 2 of the blade are slightly out of line so that when said sections are coupled together the lugs 21 of the counter-facing inserts are adjacent to each other, as shown in FIGS. 11 and 12, with the orifices 22 aligned in order for the shear type lock bolts 23 to be inserted.

Figure 13:
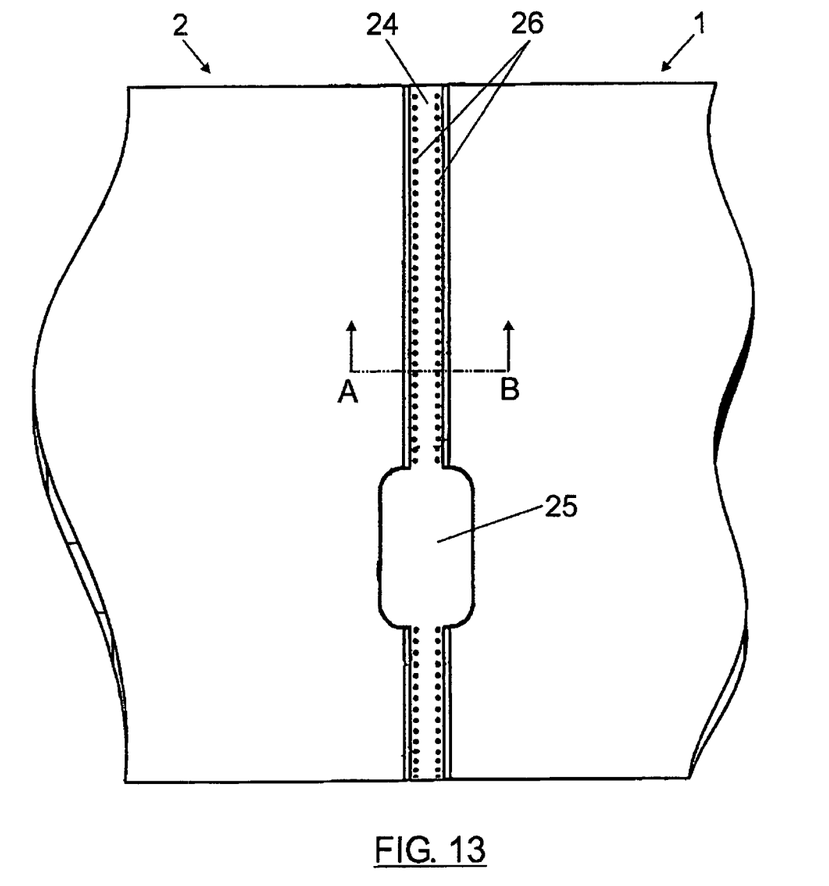
FIG. 13 is a detailed view of FIG. 1, on a larger scale.
Figure 14:
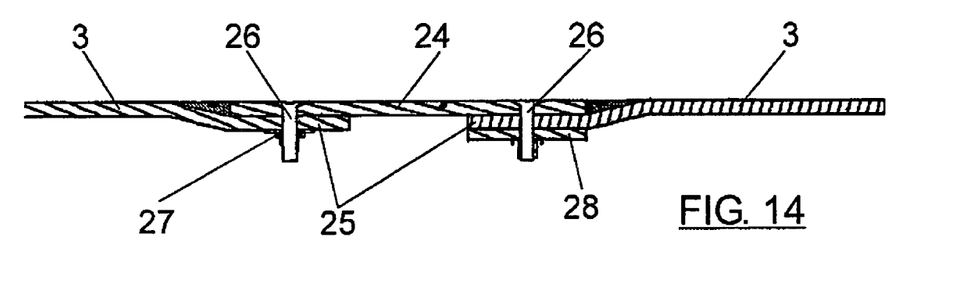
FIG. 14 is a transversal section of the shell, using line A-B of FIG. 13 for the section line.

The separation between the chambers of sections 1 and 2 can be closed by means of a cowling 24, FIGS. 13 and 14, comprised by a band coupled on the seats 25 defined by the edges of the hull 3 which, on the area occupied by the longitudinal inner reinforcing structure 4, will include a wider portion 25, corresponding with the area occupied by the longitudinal inner resistant structure 4.

This cowling can be secured by known methods, for example with screws 26 screwed into nuts 27 which can be fixed to the inner surface of the wall of the hulls 3 or it can form part of a band or auxiliary strap 28 which is fixed to the inner surface of the wall of the hulls 3, aligned with the seats 25.

The aerodynamic surface or hull 3, can be comprised of a non-structural cowling, or rather a secondary structured cowling, which includes portions 27 and 28 of the section of the sections, FIG. 2 and occupies the areas that are not in line with the longitudinal inner resistant structure 4. For this, the walls 5 of the longitudinal inner reinforcing structure 4 will have a curvature which defines, together with portions 27 and 28, a continuous surface, corresponding to the required profile of the blade.

The invention claimed is:

1. A blade for a wind-power generator, which is transversally sub-divided into one or more independent sections, each of which consists of aerodynamic walls or hulls (3) and a longitudinal inner reinforcing structure (4) conceived as a box beam running along the sections, which includes intermediate walls (6) and adjoining walls (5) that are joined by means of adhesive to the aerodynamic hulls (3) and form part of them, the sections of which are equipped with connection means on end sections of the longitudinal inner reinforcing structure (4), with said connection means having counter-facing orifices for receiving anchoring bolts or pins, wherein said connection means consist of metal inserts (10) which are housed inside a profile (9) of carbon fiber that is secured axially inside the adjoining walls (5) of the longitudinal inner reinforcing structure (4), along an end sector (15) of the same, in positions aligned with the counter-facing sections (1, 2) of consecutive sections (1, 2).

2. The blade in accordance with claim 1, wherein the adjoining walls (5) of the longitudinal inner reinforcing structure (4) upon which the metal inserts (10) are located are comprised of, at least on part of its length, a sandwich (11) formed by a layer (7) of reinforcing fibers and an intermediate core (8), with said metal inserts (10) being joined to the layers (7) of reinforcing fiber, to transmit stresses through said layers.

3. The blade in accordance with claim 2, wherein upon the adjoining walls (5) of the longitudinal inner reinforcing structure, along the end sector of the same and in line with the intermediate core (8), carbon fiber tubular profiles (9) are located defining the core of the sandwich and making contact with and being joined to the reinforcing fiber layers of said sandwich, with metal inserts (10) being located upon the profiles of the same, with said inserts (10) having an external section equal to the internal section of the profiles (9) to which they are joined by means of adhesive.

4. The blade in accordance with claim 2, wherein the sandwich of the adjoining walls (5) of the longitudinal reinforcing structure are transformed into the end sections on which the metal inserts (10) are located, on a solid laminate (12) of reinforcing fibers, upon which the housing for said inserts (10) are machined, with said inserts (10) being secured by means of adhesive to the reinforcing fibers.

5. The blade in accordance with claim 1, wherein the metal inserts (10) have counter-facing axial drilled holes (19, 20) on their external section, in order to receive connection bolts, which are anchored using nuts and function under tension.

6. The blade in accordance with claim 5, wherein the drilled hole (19) of one of the inserts (10) is threaded in order to secure one of the ends of a bolt, whilst the opposing drill hole (20) is not threaded and is slightly larger in diameter than the bolt, in order to allow said bolt to pass through and protrude by a section to receive a lock nut.

7. The blade in accordance with claim 1, wherein the metal inserts (10) have lugs (21) on their external section which are slightly out of line with the counter-facing inserts (10) so that the lugs (21) are adjacent to each other when two consecutive sections (1, 2) are joined, with said lugs (21) having counter-facing orifices (22) in the adjacent position in order to receive a shear connection bolt (23) or pin in a direction which is perpendicular to the longitudinal shaft of the sections (1, 2).

* * * * *